United States Patent
Sharma et al.

(10) Patent No.: US 9,727,591 B1
(45) Date of Patent: Aug. 8, 2017

(54) USE OF TRUST CHARACTERISTICS OF STORAGE INFRASTRUCTURE IN DATA REPOSITORIES

(71) Applicant: EMC Corporation, Hopkinton, MA (US)

(72) Inventors: Nikhil Sharma, El Dorado Hills, CA (US); Stephen Todd, Shrewsbury, MA (US); Said Tabet, Natick, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/674,218

(22) Filed: Mar. 31, 2015

Related U.S. Application Data

(63) Continuation-in-part of application No. 14/610,191, filed on Jan. 30, 2015, now Pat. No. 9,594,546.

(51) Int. Cl.
G06F 9/445 (2006.01)
G06F 17/30 (2006.01)

(52) U.S. Cl.
CPC .............................. G06F 17/30303 (2013.01)

(58) Field of Classification Search
None
See application file for complete search history.

(56) References Cited

U.S. PATENT DOCUMENTS

| | | | |
|---|---|---|---|
| 7,343,601 B2 | 3/2008 | Azagury et al. | |
| 7,752,437 B1 * | 7/2010 | Thakur | H04L 12/24 370/229 |
| 8,010,426 B2 * | 8/2011 | Kopp | G06Q 10/06 705/35 |
| 8,671,449 B1 * | 3/2014 | Nachenberg | 726/24 |
| 8,706,692 B1 * | 4/2014 | Luthra | G06F 17/30575 707/622 |
| 8,756,656 B1 * | 6/2014 | Hartmann | 726/3 |
| 8,904,299 B1 * | 12/2014 | Owen | G06F 8/315 715/763 |
| 8,972,564 B1 * | 3/2015 | Allen | G06F 11/008 709/224 |
| 9,256,656 B2 * | 2/2016 | Fankhauser | G06F 17/30563 |
| 2004/0243692 A1 * | 12/2004 | Arnold | G06F 9/5016 709/220 |

(Continued)

OTHER PUBLICATIONS

Prith Banerjee et al., The future of cloud computing: an HP Labs perspective, Dec. 21, 2012, IEEE Computer.*

(Continued)

*Primary Examiner* — Chat Do
*Assistant Examiner* — Douglas Slachta
(74) *Attorney, Agent, or Firm* — Ryan, Mason & Lewis, LLP

(57) ABSTRACT

One or more trust characteristics are obtained. The one or more trust characteristics are attributable to a storage infrastructure from which one or more data sets stored in one or more data repositories are obtained. The one or more trust characteristics attributable to the storage infrastructure are associated with the one or more data sets such that the one or more data sets are characterized as having a trustworthiness reflective of the one or more trust characteristics. The one or more trust characteristics and the association with the one or more data sets are stored as metadata in the one or more data repositories.

19 Claims, 9 Drawing Sheets

(56) References Cited

U.S. PATENT DOCUMENTS

| | | |
|---|---|---|
| 2005/0033980 A1 | 2/2005 | Willman et al. |
| 2005/0108703 A1* | 5/2005 | Hellier ............... G06F 8/64 717/174 |
| 2006/0155738 A1 | 7/2006 | Baldwin et al. |
| 2006/0161444 A1 | 7/2006 | Lubrecht et al. |
| 2008/0083036 A1 | 4/2008 | Meijer et al. |
| 2008/0091747 A1* | 4/2008 | Prahlad ............. G06F 21/6218 |
| 2008/0104060 A1 | 5/2008 | Abhyankar et al. |
| 2008/0107037 A1* | 5/2008 | Forbes et al. ............. 370/242 |
| 2008/0134332 A1* | 6/2008 | Keohane et al. ............. 726/23 |
| 2010/0058054 A1 | 3/2010 | Irvine |
| 2010/0076987 A1* | 3/2010 | Schreiner ............. G06Q 30/06 707/754 |
| 2010/0106558 A1 | 4/2010 | Li et al. |
| 2010/0250867 A1* | 9/2010 | Bettger ............. G06F 17/30587 711/152 |
| 2010/0332530 A1* | 12/2010 | Mckelvie ......... G06F 17/30584 707/770 |
| 2011/0047056 A1 | 2/2011 | Overman et al. |
| 2011/0153727 A1 | 6/2011 | Li |
| 2011/0179110 A1 | 7/2011 | Soloway |
| 2011/0191562 A1* | 8/2011 | Chou et al. .................. 711/163 |
| 2011/0231899 A1* | 9/2011 | Pulier ................ G06F 9/45558 726/1 |
| 2011/0246653 A1 | 10/2011 | Balasubramanian et al. |
| 2012/0066487 A1 | 3/2012 | Brown et al. |
| 2012/0254115 A1* | 10/2012 | Varadharajan ............... 707/640 |
| 2012/0284713 A1 | 11/2012 | Ostermeyer et al. |
| 2013/0305376 A1 | 11/2013 | Chauhan et al. |
| 2014/0019423 A1* | 1/2014 | Liensberger et al. ......... 707/690 |
| 2015/0127660 A1* | 5/2015 | Zilberberg ........ G06F 17/30563 707/748 |
| 2015/0373049 A1 | 12/2015 | Sharma et al. |
| 2015/0378788 A1* | 12/2015 | Roese .................. G06F 9/5072 709/203 |

OTHER PUBLICATIONS

Siani Pearson, Privacy, Security and Trust in Cloud Computing, Jun. 28, 2012, Springer.*

Pierre de Leusse et al. Toward governance of cross-Cloud application deployment, Mar. 2012.*

Chenyun Dai et al. An Approach to Evaluate Data Trustworthiness Based on Data Provenance, 2008, Springer-Verlag, SDM 2008, LNCS 5159, pp. 82-98.*

Ashish Gehani et al. Mendel: Efficiently Verifying teh lineage of Data Modified in Multiple Trust Domains, Jun. 2010.*

Tim Jones, Anatomy of a cloud storage infrastructure, Nov. 30, 2010.*

P. Mell et al., "The NIST Definition of Cloud Computing: Recommendations of the National Institute of Standards and Technology," Special Publication 800-145, Sep. 2011, 7 pages.

U.S. Appl. No. 14/674,121 filed in the name of Stephen Todd et al. on Mar. 31, 2015 and entitled "Lineage-Based Veracity for Data Repositories."

EMC, "EMC Centera Content—Addressable Storage—Archiving Made Simple, Affordable and Secure," http://www.emc.com/collateral/hardware/data-sheet/c931-emc-centera-cas-ds.pdf, May 2013, 4 pages.

U.S. Appl. No. 14/610,191 filed in the name of Stephen Todd et al. on Jan. 30, 2015 and entitled "Governed Application Deployment on Trusted Infrastructure."

U.S. Appl. No. 14/744,886 filed in the name of Marina Zeldin et al. Jun. 19, 2015 and entitled "Infrastructure Trust Index."

* cited by examiner

FIG. 1
100

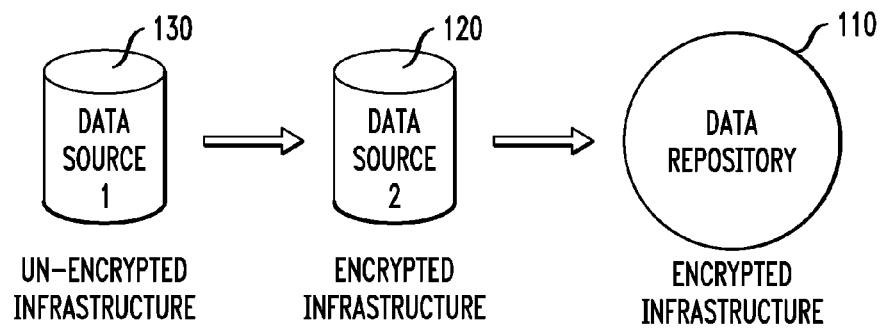

FIG. 2
200

| NAME | METRIC (EXAMPLE) | MEASURE |
|---|---|---|
| AVAILABILITY | TOTAL AVAILABILITY | 99.999 |
| | DATA UNAVAILABILITY/DATA LOSS | ABC |
| | RECOVERY POINT OBJECTIVE | 30 SECONDS |
| | RECOVERY TIME OBJECTIVE | ONLINE |
| | LOCATION | BOSTON |
| SECURITY | % VOLS PATCHED TO POLICIES | 90% |
| | % VOLS/HOSTS WITH VULNERABILITIES | 0% |
| | % SENSITIVE VOLS COMPLIANT (HIPAA, PCI...) | 100% |
| | VOLS DISCOVERED WITH SENSITIVE (OR PII) DATA | ABC |
| | VOLS WITH SUSPICIOUS LOGIN ATTEMPTS | ABC |

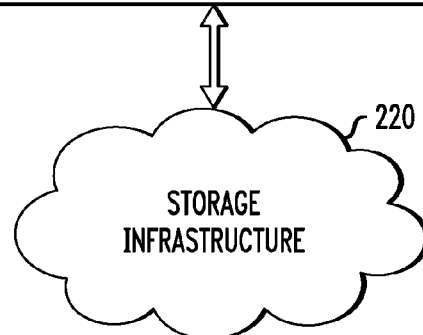

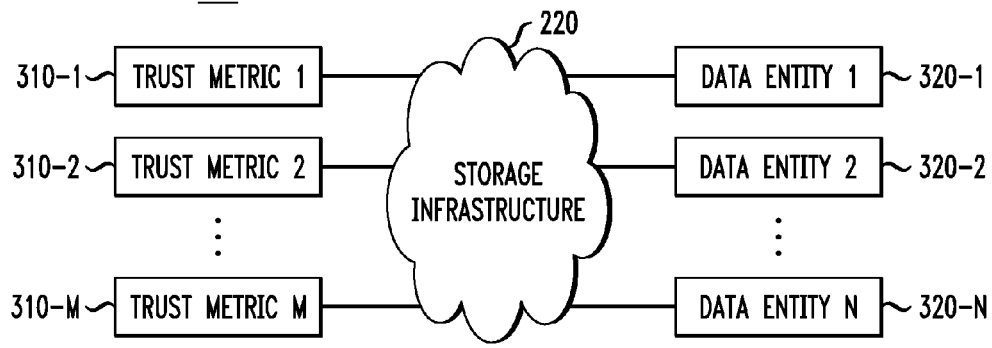
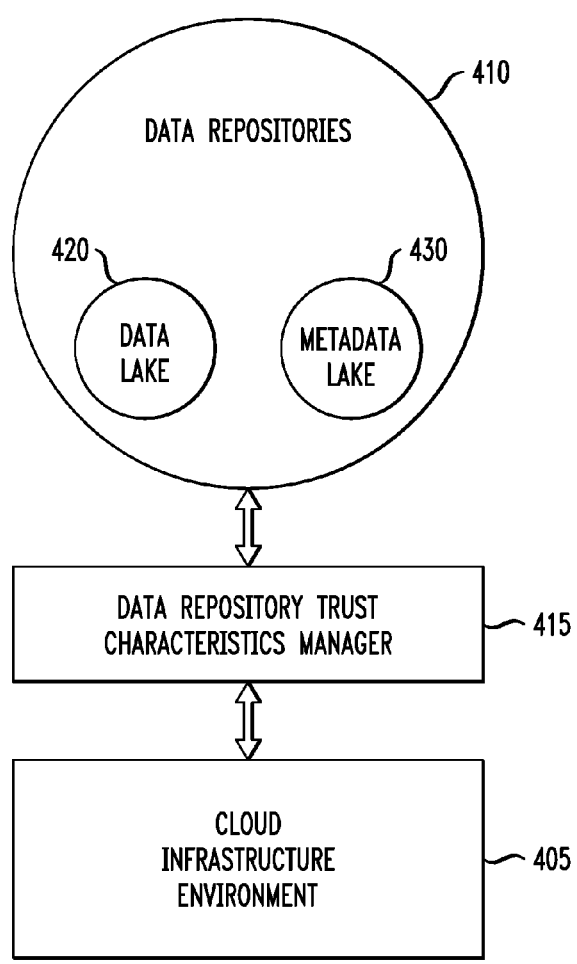

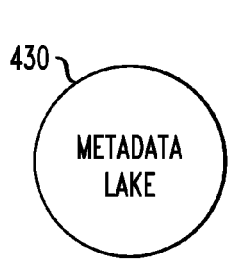

| TRUST DIM. | DATA SET 1 | DATA SET 2 | DATA SET 3 |
|---|---|---|---|
| AVAILABILITY | ☑ | ☑ | |
| SECURITY | ☑ | ☑ | |
| TRANSPARENCY | ☑ | | |
| MANAGEMENT | ☑ | | |
| SUSTAINABILITY | ☑ | ☑ | ☑ |
| SERVICEABILITY | ☑ | ☑ | ☑ |
| TRUST SCORE | 6 | 4 | 2 |

FIG. 7B
720

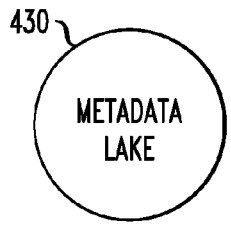

| TRUST DIM. | TRUST CHAR. | DATA SET 1 | DATA SET 2 | DATA SET 3 |
|---|---|---|---|---|
| AVAILABILITY | TOTAL AVAILABILITY | >99% ☑ | >99% ☑ | >99% ☑ |
| | RPO (2x WEIGHTAGE) | <30min ☑ | <30min ☑ | <30min |
| | RTO (2x WEIGHTAGE) | <30min ☑ | <30min | <30min |
| SECURITY | % VOLS PATCHED | >99% ☑ | >99% ☑ | >99% ☑ |
| | % VOLS WITH VULN. | <1% ☑ | <1% ☑ | <1% ☑ |
| | TRUST SCORE | 7 | 5 | 3 | ively, illustrative embodiments provide trust
USE OF TRUST CHARACTERISTICS OF STORAGE INFRASTRUCTURE IN DATA REPOSITORIES

CROSS REFERENCE TO RELATED APPLICATION

The present application is a continuation-in-part of U.S. patent application identified as Ser. No. 14/610,191 filed on Jan. 30, 2015 and entitled "GOVERNED APPLICATION DEPLOYMENT ON TRUSTED INFRASTRUCTURE," the disclosure of which is incorporated by reference herein in its entirety.

FIELD

The field relates generally to data repositories, and more particularly to applying trust characteristics of storage infrastructure to data in such data repositories.

BACKGROUND

Data repositories create a centralized location for data that can facilitate agile business or other queries and analytics by leveraging a diverse variety of data sources in order to produce business or other insight. Some common types of data repositories that a business or some other entity may maintain include, but are not limited to, data lakes, data warehouses, and data marts. A data lake is typically considered to be a centralized data storage system for structured and unstructured data. A data warehouse is typically considered to be a centralized data storage system for integrated data from one or more disparate sources. A data mart is typically considered to be a simpler data warehouse focused on a single subject.

However, data stored in any type of data repository can come from a diverse variety of data sources, and this can be a problem given that the data from one or more of the sources could be inaccurate and thus not trustworthy. As such, query results generated against such data may not be trustworthy. Furthermore, while the underlying storage infrastructure of a data repository maintained by an entity may be trusted (i.e., because the data repository is controlled by the entity), the storage infrastructure of the sources from which the data in the data repository came may or may not be trusted.

Data that is not trustworthy could have disadvantageous ripple effects, for example, for a chief data officer whose reputation (and perhaps the reputation of the company) may be tied to the correctness of data-based decisions. In addition, there are other entities outside of the business domain (e.g. regulators) that can levy additional penalties for use of incorrect data.

SUMMARY

Embodiments of the invention provide techniques for applying trust characteristics of storage infrastructure to data in data repositories.

For example, in one embodiment, a method comprises the following steps. One or more trust characteristics are obtained. The one or more trust characteristics are attributable to a storage infrastructure from which one or more data sets stored in one or more data repositories is obtained. The one or more trust characteristics attributable to the storage infrastructure are associated with the one or more data sets such that the one or more data sets are characterized as having a trustworthiness reflective of the one or more trust characteristics. The one or more trust characteristics and the association with the one or more data sets are stored as metadata in the one or more data repositories.

Advantageously, illustrative embodiments provide trust characteristics of source infrastructure to metadata tracked in the context of a data repository (e.g., data lake and/or a metadata lake). Such trust characteristics help assess the trustworthiness of the data and queries in a data lake context.

These and other features and advantages of the invention will become more readily apparent from the accompanying drawings and the following detailed description.

BRIEF DESCRIPTION OF THE DRAWINGS

FIG. 1 illustrates an example of a data source lineage used to explain embodiments of the invention.

FIG. 2 illustrates an example of trust characteristics available from a storage infrastructure, according to an embodiment of the invention.

FIG. 3 illustrates associations created between trust metrics of a storage infrastructure and data entities in a data lake, according to an embodiment of the invention.

FIG. 4A illustrates a data repository and cloud infrastructure environment in which trust characteristics management techniques are implemented, according to an embodiment of the invention.

FIGS. 7A and 7B illustrate a methodology for utilizing trust scores, according to an embodiment of the invention.

DETAILED DESCRIPTION

Figure 4B:
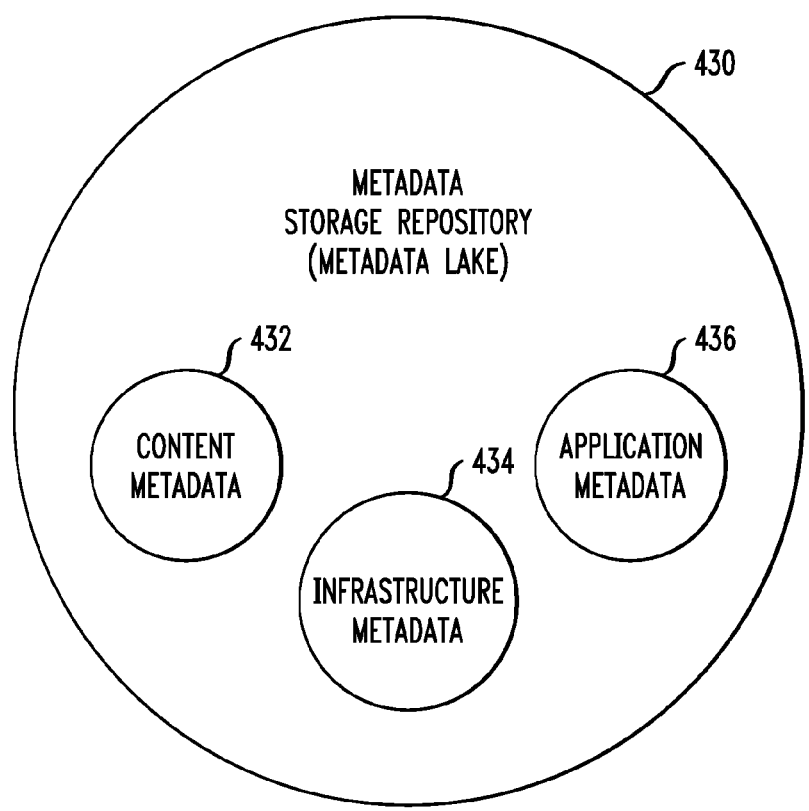
FIG. 4B illustrates a metadata lake comprising content-based metadata, infrastructure-based metadata, and application-based metadata, according to an embodiment of the invention.

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the following terms and phrases have the following illustrative meanings: "application" generally refers to one or more software programs designed to perform one or more functions; "metadata" generally refers to data that describes or defines other data; and "trusted" generally means: satisfying (or at least substantially satisfying) or being consistent with one or more trust-based criteria, e.g., policies, requirements, regulations, etc.; or possessing one or more trust attributes such as, e.g., retention-capable, encryption, immutability, etc., in the case of data; or possessing one or more trust attributes such as, e.g., availability, recovery, security, etc., in the case of infrastructure. Examples of metadata representing trust characteristics that is used and generated in accordance with embodiments of the invention include, but are not limited to, trust metrics, trust scores and trust attributes, associations between trust characteristics and data entities, as will be explained in detail herein.

It is realized herein that a significant amount of time and effort is spent in an enterprise to improve quality and trust in the data. Illustrative embodiments of the invention improve the trust in data stored in data repositories (e.g., data lakes, data warehouse, and/or data marts) by applying the trust characteristics (metrics, scores and/or attributes) of the infrastructure (e.g., security, privacy, availability, recoverability, etc.) to data entities. The trust in data is further strengthened by tracing the trust characteristics of infrastructure across the data lineage of disparate sources that feed the data repository.

It is further realized herein that underlying storage infrastructure plays a critical role in establishing trust in the data stored thereon. An unreliable infrastructure, for example, could lead to data loss or data unavailability. A secure infrastructure will lead to better data privacy and protection. While a data repository is typically aware of the trust characteristics of its underlying infrastructure, a conventional data repository does not contain additional metadata describing the trust characteristics of the lineage of the data sources from which the data stored in the data repository came. This contributes to an overall lack of trust in query results, increasing the risk of the business operation (in the case where the data repository is maintained in a business domain). In addition, as mentioned above, there are other entities outside of the business enterprise (e.g., regulators or service providers) that can increase the liability of the business enterprise due to lack of trust in the data. This lack of trust has many problems that come along with it.

There is currently no mechanisms or methodologies, within a data lake (or data warehouse or data mart), to conclude which portions of the data lake come from a source with trusted infrastructure. Since trust is only as strong as the weakest link in the lineage, there is currently no mechanisms or methodologies, within a data lake, to look at a singular data source and conclude if that data can be trusted.

In the example environment 100 of FIG. 1, it is assumed that data in data repository 110 is obtained from data source 120 and/or data source 130. The data sources represent the lineage of the data. Note that while data repository 110 and data source 120 have underlying infrastructure that employs encryption of the data stored thereon (encrypted infrastructure) and thus are considered to be trusted infrastructure, data source 130 does not employ encryption (un-encrypted infrastructure). Thus, it is assumed that any data from data source 130 (even if stored in data source 120 prior to being sent to data repository 110) is open to leakage and thus not trustworthy. Also, for any given query across multiple data sources in a data lake, there is currently no mechanism or methodologies to give a confidence measure that a query result can be trusted.

Further, there is currently no mechanism or methodologies, upon ingest into a data lake, to measure the trust of the source infrastructures, and to subsequently store or update the trust metadata of the lineage of sources. Also, there is currently no mechanism or methodologies to quarantine or raise alerts if the data source is untrusted, after ingest into a data lake, to ensure that corrective action takes place at the data source. In most systems today, the data source continues to operate unless a trust issue is detected manually.

Still further, external systems and services such as, by way of example only, Cloud operating system (OS) or Platform as a Service (PaaS), currently have no mechanisms or methodologies for knowing the trust characteristics of the underlying system. As a result, they cannot make trust based intelligent decisions on the placement of applications or data on the underlying infrastructure. Risk management systems face a similar problem, where there is currently no mechanisms or methodologies to provide trust status of the infrastructure to governance, risk management and compliance (GRC) systems. Results in decisions made through manual inference of trust characteristics result in possible errors and scale issues.

As will be explained in further detail below, U.S. patent application identified as U.S. Ser. No. 14/610,191 filed on Jan. 30, 2015 and entitled "GOVERNED APPLICATION DEPLOYMENT ON TRUSTED INFRASTRUCTURE," the disclosure of which is incorporated by reference herein in its entirety, provides one or more illustrative trust taxonomy solutions in the PaaS context.

In today's information technology (IT), there is a steady rise of big data and big data related platforms, such as metadata lakes. A "metadata lake" is a data lake that exclusively or predominantly stores metadata. The scale of big data and metadata lakes is significantly bigger than traditional data and data repositories. The chief data officer and data architects of a company, responsible for aligning trust related data requirements to the infrastructure, face an incredible scale issue in manually inferring and applying the trust characteristics of the underlying infrastructure.

Illustrative embodiments of the invention overcome the above and other drawbacks in existing data repository environments. As will be explained in further detail herein, illustrative embodiments add trust characteristics (trust metrics, scores and/or attributes) of source infrastructure to the lineage metadata tracked in the context of a data lake and/or a metadata lake. This addition of trust characteristics helps assess the trustworthiness of the data entities and queries in a data lake (or any type of data repository) context.

FIG. 2 illustrates an example 200 of trust metrics 210 available from a storage infrastructure 220, according to an embodiment of the invention. More particularly, the infrastructure 220 that hosts data such as a data lake or other type of data repository, or any data source that supplies data to a data lake or other type of data repository, is tracked based on trust related metrics, as shown in table 210.

Such metrics include, but are not limited to, availability metrics such as: total availability; data unavailability/data loss; recovery point objective; recover time objective; location; and security metrics such as: percentage of data volumes patched to policies; percentage of data volumes per hosts with vulnerabilities; percentage of sensitive volumes compliant (e.g., to some compliance standards such as Health Insurance Portability and Accountability Act or HIPAA, Payment Card Industry or PCI, etc.); volumes discovered with sensitive (e.g., Personally Identifiable Information or PII) data; volumes with suspicious login attempts. In illustrative embodiments, infrastructure 220 can be configured to provide secure application programming interfaces (APIs) to declare these metrics to authorized systems, such as a metadata lake (or other data repository) as will be further explained below.

In accordance with illustrative embodiments, data entities or data objects (more generally, data) residing on the infrastructure inherit the trust characteristics (trust attributes) of the infrastructure. For example, if there is sensitive data on a storage infrastructure that has a low availability of 90%, the sensitive data is going to show low data availability. Another example is that if a volume has a number of suspicious logins, it can mean that the data on that volume may be vulnerable. By correlating trust metrics of the infrastructure to the data in the data lake, embodiments of the invention are actually establishing the trust characteristics of the data itself. This relationship (or association) is represented in FIG. 3. Trust metrics 310-1, 310-2, . . . , 310-M attributable to storage infrastructure 220 are correlated (associated) with data entities 320-1, 320-2, . . . , 320-N. This correlation 300 is stored as metadata in a metadata lake. By establishing such relationships in the metadata lake, embodiments of the invention can infer the trustworthiness of the data by knowing the trust metrics of the underlying infrastructure. An illustrative system configured to manage such trust characteristics metadata is shown in FIG. 4.

FIG. 4A illustrates a data repository and cloud infrastructure environment in which trust characteristics management techniques as described herein are implemented, according to an embodiment of the invention. As shown in system 400, a cloud infrastructure environment 405 is operatively coupled to data repositories 410 through a data repository trust characteristics manager 415. The data repositories 410 include a data lake 420 and a metadata lake 430.

It is to be appreciated that the phrase "cloud infrastructure environment" as illustratively used herein generally refers to an environment that comprises computing resources and applications that are hosted thereon. The cloud infrastructure in one illustrative embodiment comprises an infrastructure-as-a-service (IaaS) approach with a plurality of clouds that form a plurality of data centers (e.g., software defined data centers or SDDCs). Storage infrastructures that supply data to data repositories 410 are considered part of cloud infrastructure environment 405. Likewise, the storage infrastructure that hosts the data repositories 410 can be part of the cloud infrastructure in environment 405 as well. Examples of "storage infrastructure" are described below in the context of FIG. 9.

The data repository trust characteristics manager 415, as will be further described herein, extracts the trust characteristics (trust metrics and/or attributes) from the infrastructure associated with data sources that supply data to the data lake 420. The manager 415 is also configured to extract such trust characteristics from the infrastructure on which the data repositories 410 reside. Data lake 420 stores the content (data sets) and metadata lake 430 stores the extracted trust characteristics. The data repository trust characteristics manager 415 is also configured to compute trust scores as will be further explained herein.

The above-referenced U.S. patent application identified as U.S. Ser. No. 14/610,191 describes routing and storage of infrastructure based metadata and application/infrastructure relationship in a metadata lake. Thus, in an illustrative embodiment, metadata lake 430 in FIG. 4A may be implemented, at least in part, as a metadata lake described in U.S. Ser. No. 14/610,191. As shown in FIG. 4B, a metadata storage repository 430 contains a combination of semantic (content) metadata 432, infrastructure-based metadata 434, and application metadata 436. Thus, metadata 432 is considered metadata associated with content associated with applications, metadata 434 is considered metadata associated with a cloud infrastructure environment in which applications are deployable, and metadata 436 is considered metadata associated with the applications.

It is to be appreciated that each type of metadata described in FIG. 4B can be obtained through trust characteristics manager 415 in FIG. 4A. Trust characteristics of the underlying infrastructure extracted by trust characteristics manager 415 can be similarly stored in the same metadata lake 430 along with the other types of metadata shown in FIG. 4B. The infrastructure can also be configured to declare its trust characteristics, which will be captured and stored by the manager 415 in the metadata lake 430.

Figure 4C:
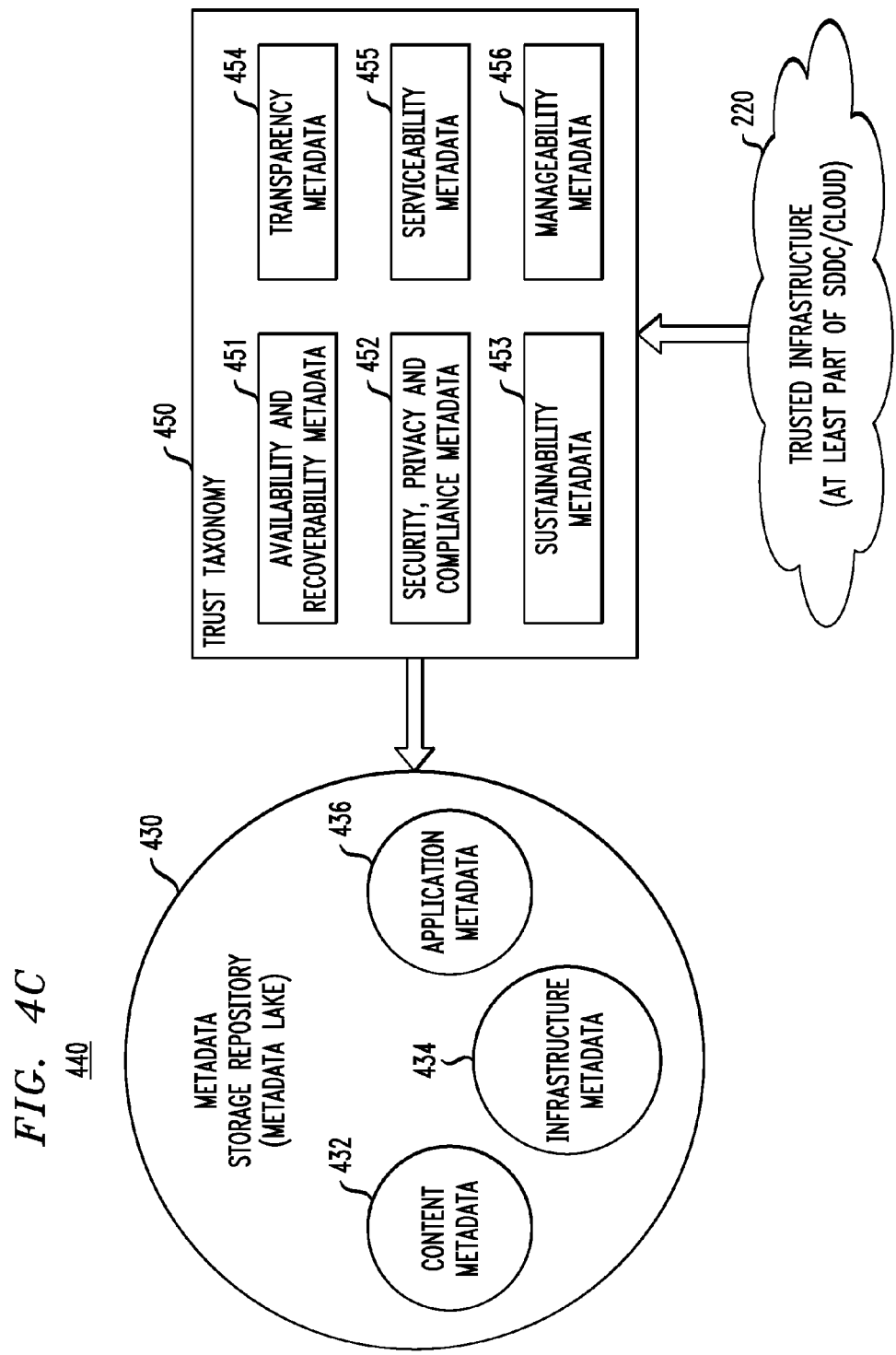
FIG. 4C illustrates a trust taxonomy established in a metadata lake, according to an embodiment of the invention.

Furthermore, a trust taxonomy as described in U.S. Ser. No. 14/610,191 can be established in metadata lake 430. For example, FIG. 4C illustrates a trust taxonomy generated in a metadata lake according to an embodiment of the invention. More particularly, scenario 440 illustrates trusted infrastructure 220 supplying metadata describing its trust capabilities (characteristics) to metadata lake 430. These trust capabilities are defined as one or more trust dimensions and, in this embodiment, comprise: (i) availability and recoverability; (ii) security, privacy and compliance; (iii) sustainability; (iv) transparency, (v) serviceability, and (vi) manageability. Thus, as shown in trust taxonomy 450, these dimensions are expressed as: availability and recoverability metadata 451; security, privacy and compliance metadata 452; sustainability metadata 453; transparency metadata 454; serviceability metadata 455; and manageability metadata 456.

More specifically, availability and recoverability metadata 451 comprises statistics or other metrics that describe and/or quantify the infrastructure's ability to perform its agreed upon function(s) when required, as well as its ability to recover from failure(s). Security, privacy and compliance metadata 452 comprises statistics or other metrics that describe and/or quantify the infrastructure's ability to ensure confidentiality, integrity and compliance of data and infrastructure. Sustainability metadata 453 comprises statistics or other metrics that describe and/or quantify the infrastructure's ability to enable increased power and/or energy efficiencies and ensure ethical practices. Transparency metadata 454 comprises statistics or other metrics that describe and/or quantify the infrastructure's ability to provide standardized access to customer operational reports and reporting against trust objectives. Serviceability metadata 455 comprises statistics or other metrics that describe and/or quantify the infrastructure's ability to facilitate technical support and problem resolution. Manageability metadata 456 comprises statistics or other metrics that describe and/or quantify the infrastructure's ability to enable automation and interoperability in managing trust-based criteria.

Again, these metrics shown in taxonomy 450 can be extracted from a storage infrastructure by trust characteristics manager 415 in FIG. 4A or infrastructure can be configured to declare these trust characteristics to trust characteristics manager 415.

U.S. patent application identified as Ser. No. 14/674,121 filed concurrently herewith and entitled "LINEAGE-BASED VERACITY FOR DATA REPOSITORIES," the disclosure of which is incorporated by reference herein in its entirety, describes storage of lineage characterizations in a metadata lake. Since trust characteristics are stored in the same metadata lake, not only can the system track the trust characteristics of the underlying infrastructure of the data lake, but the system can trace back the entire lineage of the data sources and hence infer the trust characteristic of the data based on the lineage rather than just the last known infrastructure that the data rested on. Recall that data source 130 in FIG. 1 was un-encrypted infrastructure and thus not trustworthy. Thus, in accordance with illustrative embodiments, data from data source 130 is marked suspect as the lineage traces to un-encrypted infrastructure.

The above-referenced U.S. patent application identified as EMC-14-1126 describes association of lineage characteristics to generate a veracity score. The veracity score can be further enriched by adding trust characteristics in accordance with illustrative embodiments of the invention to the lineage based veracity score. A scoring metric can be setup that provides a score and weight to various trust characteristics described above.

Given the ability of a data scientist or data architect to measure the score of a given data set within a data lake, they now have a framework for creating trusted queries/models based on those data sets. The results of these queries can actually generate a "trustworthiness" result (e.g., the scores across all data sets is 3.5 out of 5). Alternatively, a query can be requested for a score of greater than 4.

Still further, trusted infrastructure can be classified into classes. Illustrative embodiments can define trust into levels of bronze, silver, gold, and platinum classes. Queries can be made to specifically retrieve data on infrastructure with a specific classification, e.g., platinum or gold.

The access to trust related queries and APIs, of the metadata lake, can be provided to a third party (e.g., a regulator) as "auditable," meaning that should the third party wish to audit the results, the query can be re-run and guaranteed to produce the same results.

Illustrative embodiments can also construct queries that align to specific compliance requirements or a regulation. For example, a query can be made to retrieve credit card information where infrastructure is not PCI compliant.

Examples will now be given of real-world instances of how the above trust characteristics management functionalities can be implemented.

Figure 5:
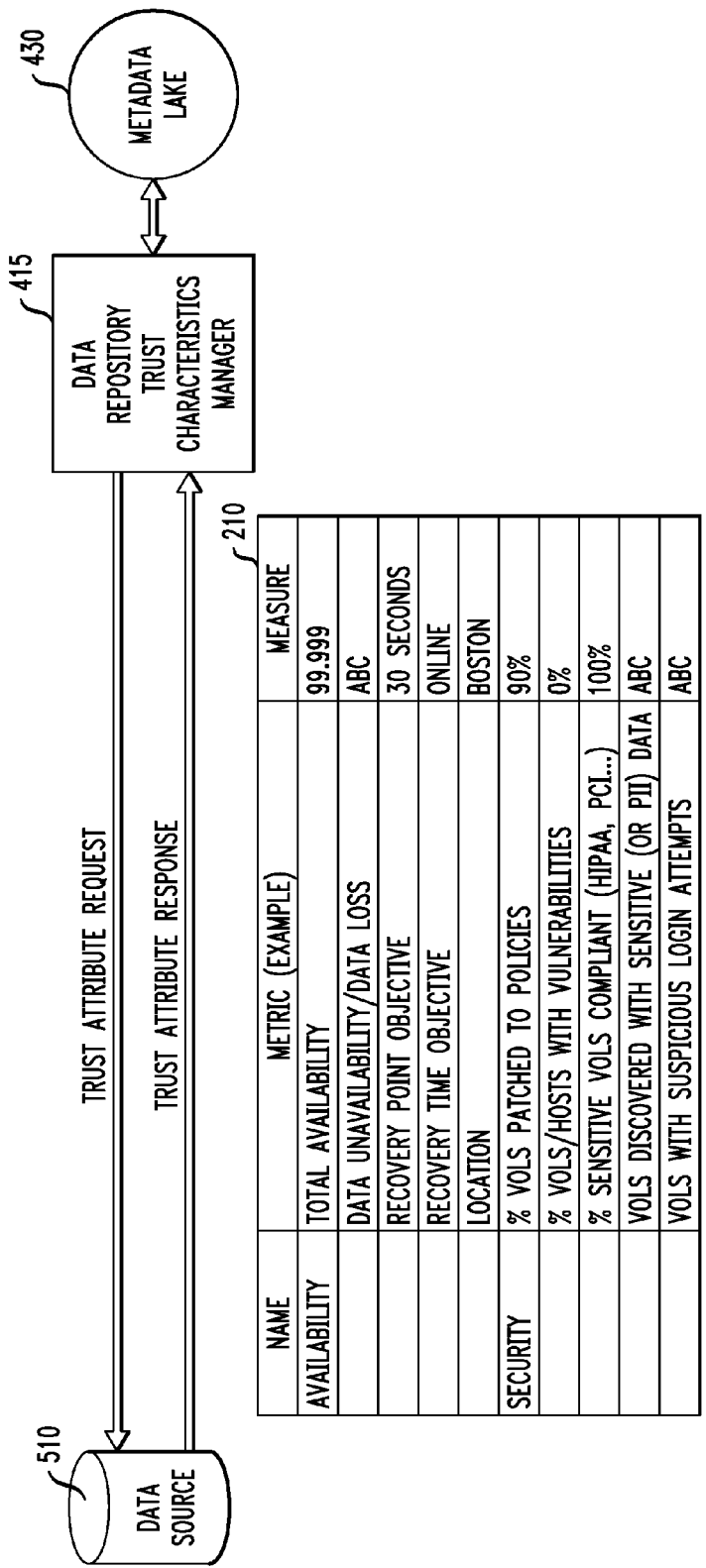
FIG. 5 illustrates a methodology for a metadata lake to extract trust characteristics from a data source, according to an embodiment of the invention.

In an illustrative embodiment, the trust characteristics manager 415 is able to extract trust characteristics of the storage infrastructure from APIs in the infrastructure. This process may be first triggered when the metadata lake first registers an application or data store, with its data entities, policies, and taxonomy. An application is associated with the underlying infrastructure, along with the infrastructure's related trust characteristics. The characteristics are dynamic; hence, the extraction can be timed at a frequency set per business needs. FIG. 5 illustrates an example whereby the trust characteristics manager 415 sends a trust attribute request to a data source 510. In response, the data source 510 provides a set of trust attributes, e.g., trust metrics 210 or any other trust characteristics described herein, to the trust characteristics manager 415 which then associates the trust characteristics with the data entities from data store 510 that are stored in the data lake 420. The metadata lake 430 stores these associations (relationships) and the underlying trust characteristics. The trust characteristics can be time stamped as they are dynamic and change with time. This allows for trust queries on a time-based snapshot.

As explained above, the metadata lake 430 stores the relationships of applications, data, and infrastructure. The metadata lake 430 can also host data policy, as illustrated in FIGS. 6A and 6B.

Figure 6A:
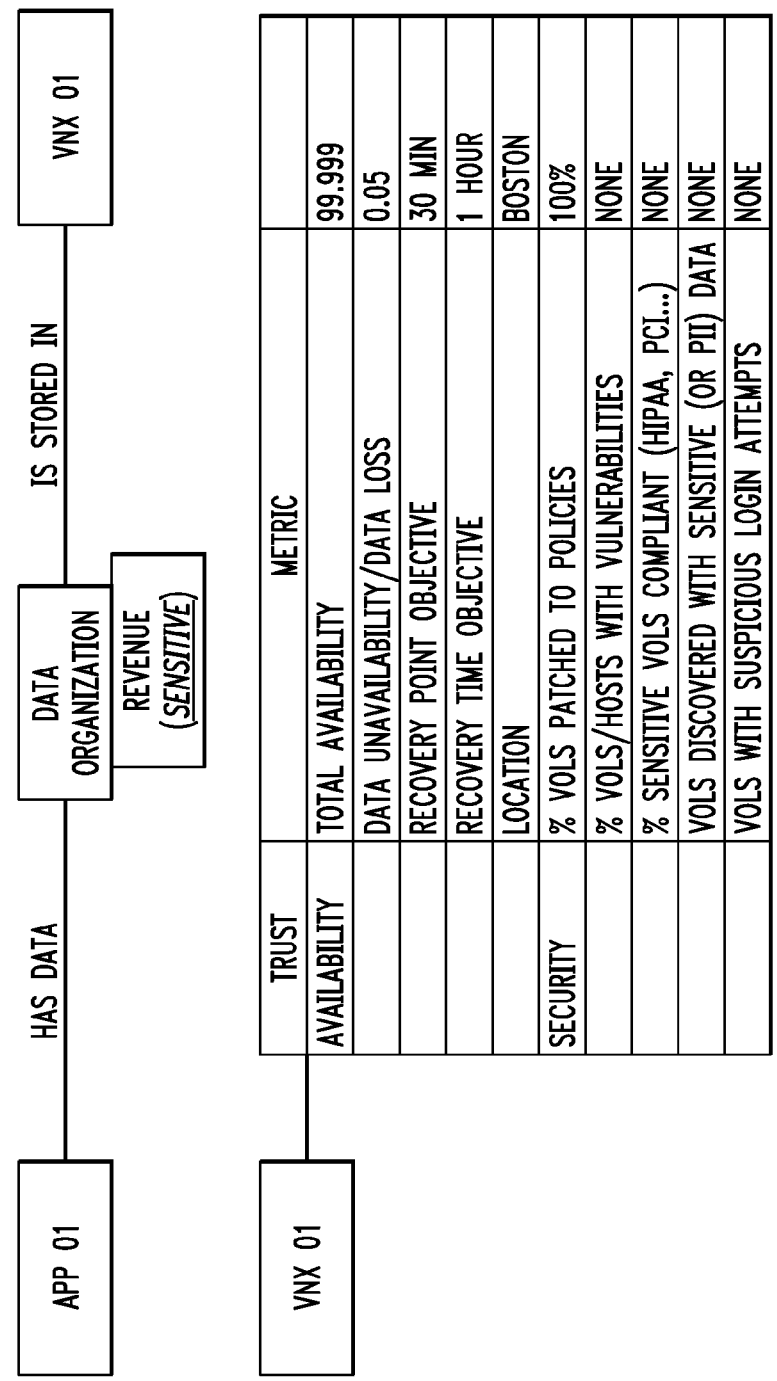
FIGS. 6A and 6B illustrate a methodology for inferring trust characteristics, according to an embodiment of the invention.

In the example 610 shown in FIG. 6A, it is assumed that the metadata lake 430 is aware that VNX 01 stores sensitive revenue data received from an application (App 01). This is acceptable as the trust characteristics of VNX 01 confirm that VNX 01 is a trusted infrastructure, with strong trust characteristics as shown in the table in example 610.

Figure 6B:
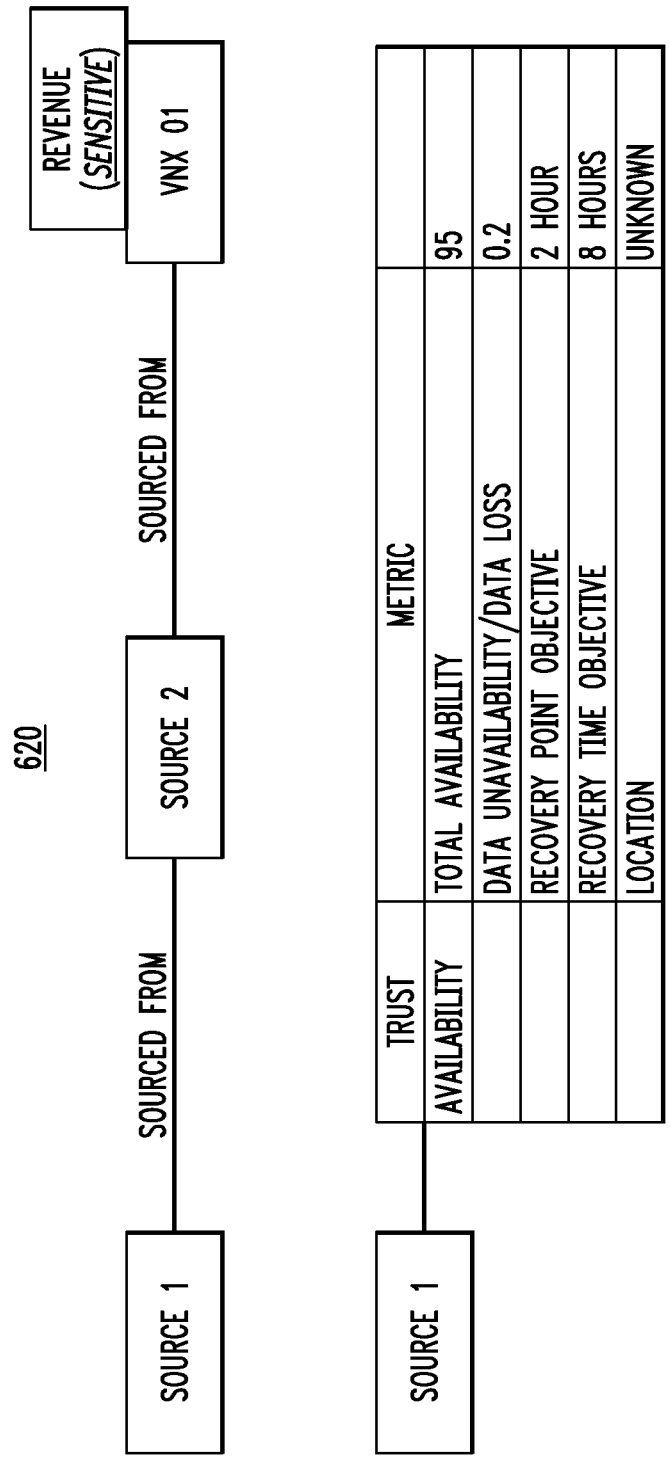

We now look at the same data with the lineage properties associated from metadata as illustrated in example 620 of FIG. 6B. Example 620 clearly shows a red flag, as revenue data, classified as sensitive, is being sourced from Source 1 which is not on trusted infrastructure. The availability of Source 1 is 95% and a data loss of 2 hours is anticipated in the case of recovery (as indicated in the trust metrics table in example 620). Accordingly, even though revenue resides on a trusted infrastructure (VNX01) in its final destination, it should not be considered trusted as a failure of Source 1 will cause data loss in VNX01.

Recall as mentioned above that concurrently-filed U.S. patent application identified as EMC-14-1126 describes trust based on lineage. Illustrative embodiments of the invention enhance the lineage score based on trust characteristics as described herein. More particularly, the concept of veracity scores computed for data as described in EMC-14-1126 may be applied to trust scores computed for infrastructure. This is illustrated in example 710 in FIG. 7A and example 720 in FIG. 7B.

Some users may choose to associate a numerical value, with equal weightage, to trust dimensions (e.g., availability, security, transparency, management, sustainability, and serviceability). For example, example 710 in FIG. 7A shows a rating of one associated equally to the presence of each trust dimension (trust characteristic). So Data Set 1 is given a trust score of 6, Data Set is given a 4, and Data Set 3 is given a 2. In accordance with embodiments of the invention, these trust scores computed and assigned to the data sets are reflective of the trustworthiness of the underlying storage infrastructure from which the data sets were respectively obtained.

Some users may choose to have the system create a more specific trust score on certain characteristics of certain dimensions. They may further choose to add weight to certain characteristics. Example 720 in FIG. 7B highlights selecting scores based on certain characteristics of availability and security, with higher weightage on a recovery point Objective (RPO) and a recover point objective (RTO), thus making the trust scores for each data set change (now 7, 5, and 3 for Data Set 1, Data Set 2, and Data Set 3, respectively).

Similarly, the trust scores can be made to align with compliance requirements of regulations. For example, assume a chief financial officer (CFO) of a company asks to provide annual revenues for 2013 for a shareholder meeting. The chief data officer (CDO) needs to understand the current revenue base and therefore needs to analyze any and all data stores/applications that interact with revenues. The CDO understands that revenue is a sensitive data, governed by many regulations. The CDO will have to ensure, before passing aggregate data to the CFO, that all the source systems are compliant to required regulatory requirements. This is accomplished by querying the metadata lake 430 for the required trust scores as shown in FIGS. 7A and 7B.

Figure 8:
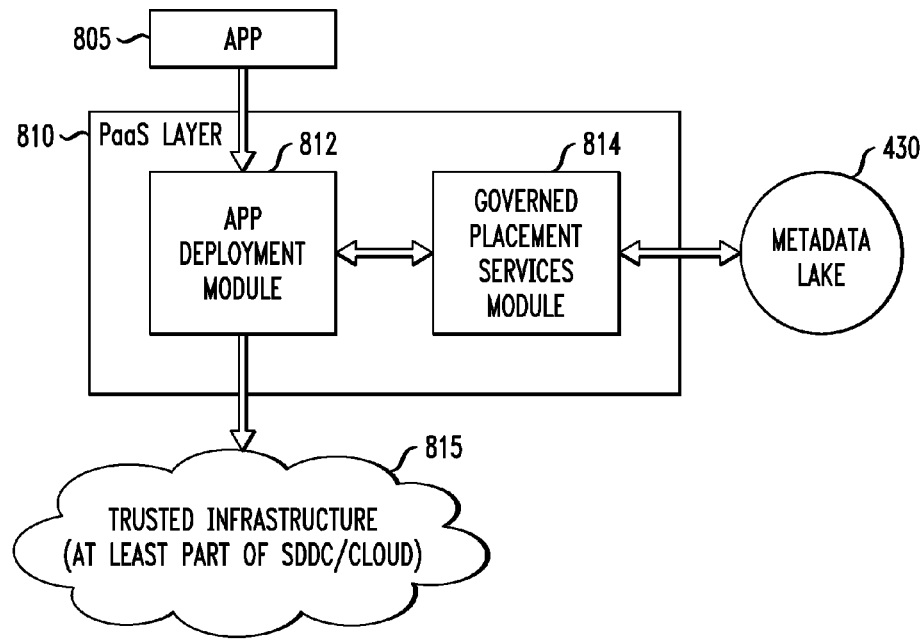
FIG. 8 illustrates a methodology for extracting trust characteristics for an external service, according to an embodiment of the invention.

Access can be given to external systems or services to extract trust characteristics of the infrastructure to make intelligent trust related decisions. FIG. 8 illustrates an example of this functionality using the governed application placement of U.S. Ser. No. 14/610,191. More particularly, system environment 800 in FIG. 8 shows a Platform as a Service (PaaS) system, such as Cloud Foundry, extracting trust characteristics from metadata lake 430 to make governed decisions regarding the placement of applications. The requirement of the application and the data are used to map to the trust characteristics in the placement decision.

As shown in FIG. 8, an application 805 is provided to a PaaS layer 810. The application developer seeks to have application 805 deployed on trusted infrastructure due to some trust-based criteria such as policy, requirement, regulation, or the like, associated with the application. Existing PaaS tools are not typically able to take into account such trust-based criteria or identify which cloud infrastructure would be able to best satisfy such criteria, nor map the two pieces of information to one another.

In accordance with one embodiment, PaaS layer 810, in conjunction with metadata lake 430, is configured to determine a deployment for application 805 on a trusted infrastructure within the cloud infrastructure environment based on at least a subset of the metadata maintained in the metadata lake. This is accomplished with application deployment module 812 and governed placement services module 814. More particularly, a request to deploy application 805 is presented to application deployment module 812. Application deployment module 812 calls governed placement services module 814 which determines the deployment of application 805 based on a subset of the metadata stored in metadata lake 430 by mapping trust-based criteria (e.g., policies, requirements, regulations, etc.) associated with application 805 with a portion of infrastructure that satisfies the trust-based criteria, in this example, trusted infrastructure 815.

More particularly, governed placement services module 814 queries the metadata lake 430 for information useful in identifying placement on a trusted infrastructure. Governed placement services module 814 comprises logic configured to interpret one or more policies (e.g., corporate policies) for the application and map the one or more policies against available trusted infrastructure for the purpose of deploying the application and its associated data on top of the trusted infrastructure. Such logic can be encoded in various ways including, but not limited to, using semantic tools and rule-based declarative approaches.

Once a placement decision is made by governed placement services module 814, module 814 notifies application deployment module 812 which, in turn, deploys the application on the identified trusted infrastructure 815. The metadata lake 430 is also notified of the placement decision by module 814. Metadata lake 430 stores this information which serves as an audit trail for subsequent query services.

Figure 9:
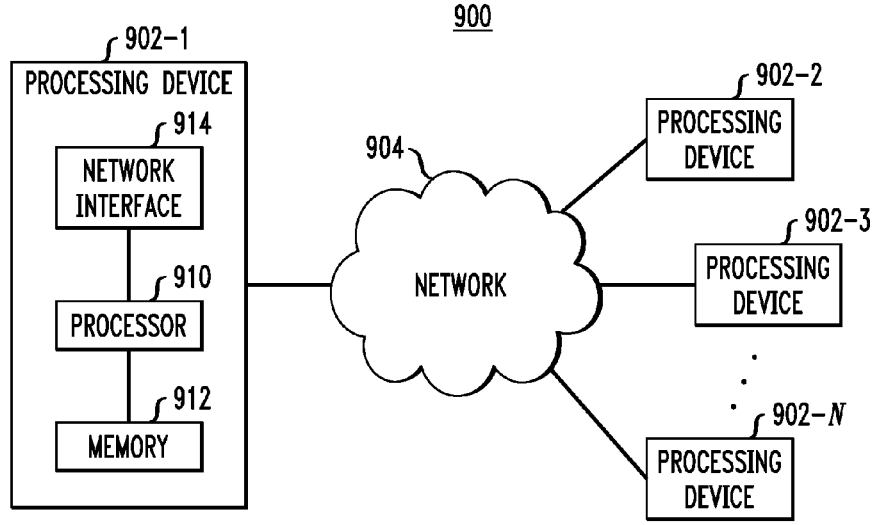
FIG. 9 illustrates a processing platform used to implement a data repository and cloud infrastructure environment in which trust characteristics management techniques are implemented, according to an embodiment of the invention.

As an example of a processing platform on which a data repository and cloud infrastructure environment with trust characteristics management (e.g., 400 in FIG. 4A) can be implemented is processing platform 900 shown in FIG. 9. The processing platform 900 in this embodiment comprises a plurality of processing devices, denoted 902-1, 902-2, 902-3, . . . 902-N, which communicate with one another over a network 904. It is to be appreciated that the trust characteristics management methodologies described herein may be executed in one such processing device 902, or executed in a distributed manner across two or more such processing devices 902. The cloud infrastructure environment may also be executed in a distributed manner across two or more such processing devices 902. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 9, such a device generally comprises at least one processor and an associated memory, and implements one or more functional modules for instantiating and/or controlling features of systems and methodologies described herein. Multiple elements or modules may be implemented by a single processing device in a given embodiment.

The processing device 902-1 in the processing platform 900 comprises a processor 910 coupled to a memory 912. The processor 910 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 910. Memory 912 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 912 may comprise electronic memory such as random access memory (RAM), read-only memory (ROM) or other types of memory, in any combination. The one or more software programs when executed by a processing device such as the processing device 902-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 902-1 also includes network interface circuitry 914, which is used to interface the device with the network 904 and other system components. Such circuitry may comprise conventional transceivers of a type well known in the art.

The other processing devices 902 (902-2, 902-3, . . . 902-N) of the processing platform 900 are assumed to be configured in a manner similar to that shown for computing device 902-1 in the figure.

The processing platform 900 shown in FIG. 9 may comprise additional known components such as batch processing systems, parallel processing systems, physical machines, virtual machines, virtual switches, storage volumes, etc. Again, the particular processing platform shown in this figure is presented by way of example only, and the data repository and cloud infrastructure environment collectively shown as 400 in FIG. 4A may include additional or alternative processing platforms, as well as numerous distinct processing platforms in any combination.

Also, numerous other arrangements of servers, clients, computers, storage devices or other components are possible in processing platform 900. Such components can communicate with other elements of the processing platform 900 over any type of network, such as a wide area network (WAN), a local area network (LAN), a satellite network, a telephone or cable network, or various portions or combinations of these and other types of networks.

Furthermore, it is to be appreciated that the processing platform 900 of FIG. 9 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 900 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 900 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system environment 100 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   receiving, at a centralized data repository, one or more data sets from one or more sources, the one or more sources being associated with at least one cloud storage infrastructure;
   obtaining one or more trust characteristics of the cloud storage infrastructure from which the one or more data sets are obtained, wherein obtaining the one or more trust characteristics comprises extracting the one or more trust characteristics from the cloud storage infrastructure via an application programming interface for the cloud storage infrastructure;
   classifying the cloud storage infrastructure into one of a set of trust classes based on the one or more obtained trust characteristics;
   associating the one or more trust characteristics of the classified cloud storage infrastructure with the one or more data sets such that the one or more data sets are characterized as having a trustworthiness reflective of the one or more trust characteristics of the classified cloud storage infrastructure;
   storing the one or more trust characteristics and the association with the one or more data sets as metadata in a metadata repository configured to interact with the centralized data repository, wherein the one or more trust characteristics are time stamped when stored as metadata in the trust repository; and
   utilizing at least a portion of the time stamped metadata stored in the metadata repository to assist in making one or more trust-based decisions in response to a request for a time-based snapshot of the trust characteristics, wherein the one or more trust-based decisions comprise determining a deployment of an application program and the one or more data sets on a cloud storage infrastructure selected based on at least a portion of the time stamped metadata corresponding to the requested time-based snapshot of the trust characteristics, wherein the selected cloud storage infrastructure on which the application and the one or more data sets are to be deployed is characterized as having a trustworthiness reflective of the one or more trust characteristics associated with the one or more data sets; and
   wherein one or more of the above steps are performed via at least one processing device.

2. The method of claim 1, wherein the one or more trust characteristics are obtained by the cloud storage infrastructure declaring the one or more trust characteristics.

3. The method of claim 1, further comprising computing one or more trust scores based on the one or more trust characteristics, and storing the one or more trust scores as metadata in the metadata repository.

4. The method of claim 1, wherein the one or more trust characteristics represent one or more trust metrics of the cloud storage infrastructure comprising: (i) availability and recoverability; (ii) security, privacy and compliance; (iii) sustainability; (iv) transparency; (v) serviceability; and (vi) manageability.

5. The method of claim 1, wherein the centralized data repository comprises a data lake for storing the one or more data sets and the metadata repository comprises a metadata lake for storing the metadata representative of the trustworthiness of the one or more data sets stored in the data lake.

6. The method of claim 1, wherein the one or more trust characteristics are extracted from the cloud storage infrastructure at a specified frequency.

7. The method of claim 1, further comprising computing a trust metric determined based on the associated of the one or more trust characteristics with the at least one data set.

8. The method of claim 1, further comprising using the association created for the one or more data sets with the one or more trust characteristics of the cloud storage infrastructure from which the data sets are obtained to determine a trust lineage of the one or more data sets through each of the one or more data sources from which the one or more data sets came.

9. The method of claim 8, wherein determining the trust lineage comprises tracing the one or more trust characteristics of the cloud storage infrastructure across a data lineage of the one or more sources from which the one or more data sets are received.

10. The method of claim 1, wherein the request is part of an audit request.

11. The method of claim 10, wherein the audit request is associated with a compliance requirement or regulation.

12. The method of claim 1, wherein the request comprises a request from a service to provide at least part of the metadata stored in the metadata repository to the service to assist the service in making a trust-based decision, and providing the response comprises sending the requested metadata.

13. The method of claim 12, wherein the service is a governed application placement service.

14. A system comprising:
one or more processors operatively coupled to one or more memories configured to:
receive, at a centralized data repository, one or more data sets from one or more sources, the one or more sources being associated with at least one cloud storage infrastructure;
obtain one or more trust characteristics of the cloud storage infrastructure from which one or more data sets stored in the centralized data repository are obtained, wherein the obtaining of the one or more trust characteristics comprises an extraction of the one or more trust characteristics from the cloud storage infrastructure via an application programming interface of the cloud storage infrastructure;
classify the cloud storage infrastructure into one of a set of trust classes based on the one or more obtained trust characteristics;
associate the one or more trust characteristics of the classified cloud storage infrastructure with the one or more data sets such that the one or more data sets are characterized as having a trustworthiness reflective of the one or more trust characteristics of the classified cloud storage infrastructure;
store the one or more trust characteristics and the association with the one or more data sets as metadata in a metadata repository configured to interact with the centralized data repository, wherein the one or more trust characteristics are time stamped when stored as metadata in the trust repository; and
utilize at least a portion of the time stamped metadata stored in the metadata repository to assist in making one or more trust-based decisions in a response to a request for a time-based snapshot of the trust characteristics,
wherein the one or more trust-based decisions comprise a determination of a deployment of an application program and the one or more data sets on a cloud storage infrastructure selected based on at least a portion of the time stamped metadata corresponding to the requested time-based snapshot of the trust characteristics; and
wherein the selected cloud storage infrastructure on which the application and the one or more data sets are to be deployed is characterized as having a trustworthiness reflective of the one or more trust characteristics associated with the one or more data sets.

15. The system of claim 14, wherein the one or more trust characteristics are obtained by the cloud storage infrastructure declaring the one or more trust characteristics.

16. The system of claim 14, wherein the one or more processors are further configured to use the association created for the one or more data sets with the one or more trust characteristics of the cloud storage infrastructure from which the data sets are obtained to determine a trust lineage of the one or more data sets through each of the one or more data sources from which the one or more data sets came.

17. The system of claim 14, wherein the one or more processors are further configured to compute a trust metric determined based on the associated of the one or more trust characteristics with the at least one data set.

18. An article of manufacture comprising a processor-readable storage medium having encoded therein executable code of one or more software programs, wherein the one or more software programs when executed by one or more processing devices implement steps of:
receiving, at a centralized data repository, one or more data sets from one or more sources, each of the one or more sources being associated with a respective cloud storage infrastructure;
obtaining one or more trust characteristics of the cloud storage infrastructure from which the one or more data sets are obtained, wherein obtaining the one or more trust characteristics comprises extracting the one or more trust characteristics from the cloud storage infrastructure via one or more application programming interfaces of the cloud storage infrastructure;
classifying the cloud storage infrastructure into one of a set of trust classes based on the one or more obtained trust characteristics;
associating the one or more trust characteristics of the classified cloud storage infrastructure with the one or more data sets such that the one or more data sets are characterized as having a trustworthiness reflective of the one or more trust characteristics of the classified cloud storage infrastructure;
storing the one or more trust characteristics and the association with the one or more data sets as metadata in a metadata repository configured to interact with the centralized data repository, wherein the one or more trust characteristics are time stamped when stored as metadata in the trust repository; and
utilizing at least a portion of the time stamped metadata stored in the metadata repository to assist in making one or more trust-based decisions in a response to a request for a time-based snapshot of the trust characteristics,
wherein the one or more trust-based decisions comprise determining a deployment of an application program and the one or more data sets on a cloud storage infrastructure selected based on at least a portion of the time stamped metadata corresponding to the requested time-based snapshot of the trust characteristics; and wherein the selected cloud storage infrastructure on which the application and the one or more data sets are to be deployed is characterized as having a trustworthiness reflective of the one or more trust characteristics associated with the one or more data sets.

19. The article of claim 18, further comprising computing a trust metric determined based on the associated of the one or more trust characteristics with the at least one data set.

\* \* \* \* \*